United States Patent [19]
Ward

[11] 3,827,330
[45] Aug. 6, 1974

[54] MUSIC TEACHING DEVICE
[76] Inventor: Daniel Ward, 150 W. Eckerson Rd., Spring Valley, N.Y. 10977
[22] Filed: Apr. 11, 1973
[21] Appl. No.: 349,917

[52] U.S. Cl. ................................. 84/472, 84/485
[51] Int. Cl. ......................................... G10b 15/02
[58] Field of Search ............ 84/470, 471, 477, 478, 84/484, 485

[56] References Cited
UNITED STATES PATENTS

| | | | |
|---|---|---|---|
| 539,191 | 5/1895 | Pond | 84/471 |
| 1,509,320 | 9/1924 | Schneider | 84/485 |
| 1,556,147 | 10/1925 | Johnson et al. | 84/485 |
| 1,913,233 | 6/1933 | De Francesco | 84/464 |
| 2,225,084 | 12/1940 | Pierce | 84/477 |
| 2,473,199 | 6/1949 | Garcia | 84/464 |
| 2,505,608 | 4/1950 | Edwards | 84/470 |
| 3,331,271 | 7/1967 | Glenn | 84/478 |
| 3,403,591 | 10/1968 | Weitzner | 84/485 |
| 3,577,824 | 5/1971 | Lavan | 84/470 X |

*Primary Examiner*—Lawrence R. Franklin
*Attorney, Agent, or Firm*—Finnegan, Henderson, Farabow & Garrett

[57] ABSTRACT

This invention relates to music teaching devices and, more particularly, to a manipulative and audio-visual music education aid which provides novel tactile and audio-visual demonstration of musical concepts.

13 Claims, 4 Drawing Figures

PATENTED AUG 6 1974

3,827,330

MUSIC TEACHING DEVICE

BACKGROUND AND OBJECTIVES

Today conventional written notation for music is done on a staff, a set of five parallel horizontal lines. Upon and between these lines musical notes are written, thus indicating their relative pitch and, if a clef is used, their absolute pitch. Staff notation is used to symbolize or visually represent music played upon an instrument or that produced by other means, such as by phonograph or by the voice.

In teaching music, the staff is frequently referred to in order to clarify musical concepts--about the general nature of the music, about constituent elements, about expressive aspects, and the like.

While the staff has been developing as a teaching device since before Guido D'Arezzo's time, (c. 995 A.D.) many other devices also have been found useful in teaching music. Some of our more recent developments have all but automated musical learning procedures particularly in the area of music reading, demonstrating unusual efficiency in getting the student to read staff notation.

But, music educators are faced with the problem that the staff and other available teaching devices do not provide a means by which "pitch distance" between semi-tones can be manipulatively demonstrated, and concretely and mathematically graphed, using a root, single physical unit of measurement that does not vary in size from semi-tone to semi-tone. Until such can be provided to illucidate the present music notation system, much ambiguity and inexactness lies in the student's mind as to the "tonal space" relationships in the existing occidental scales and tonal systems.

Further, no known device presently is available whereby such exactly demonstrated "tonal space" relationships can be both manipulatively and visually related to basic instrumental typographies, including but not limited to keyboards, fretboards, tablatures, and fingerboards.

Most music teaching methods used today depend greatly upon aural perception and on approaching sound "by ear," maintaining that there is no substitute for hearing the actual sound. This approach using the ear, however, does not imply the elimination or even abridgement of a multisensory approach to music instruction, one which reflects individual teaching and learning styles. Leading music educators incorporate sensory approaches in addition to that of the auditory according to the educator's style, the student's learning style, materials being used and the particular cultural setting.

Further, though music teaching methods used today depend greatly upon aural perception it becomes apparent in dealing with students that what may be aurally perceived by one student may be quite unconsciously screened out by another. Because of cultural, training, and sensitivity differences all students will not aurally perceive the same. In dealing with such, linking up auditory materials with other sensory materials has been found to be effective in helping to bridge these differences. The student becomes more sensitive when the instructor begins attempting simultaneous association of the various senses, opening up possibilities of perception in areas previously unknown.

It has been further found that problems related to poor auditory discrimination, poor visual discrimination, poor visual or auditory memory, poor spatial orientation, poor figure-ground discrimination, and confused laterality have been reduced significantly using the multisensory approach. Whether information being taught is on tonal structures, instrumental finger patterns, or the over-all design of a particular instrument, the ability of the perceiver to refer to a multisensory device readily and frequently, particularly as the information becomes increasingly difficult, becomes basic if reinforcement is to take place.

In view of the above, accordingly, an objective of this invention is to provide a teaching device which has a tactual, manipulative and visual spacial framework which effectively and accurately demonstrates tonal auditory space, particularly "pitch distance" between semi-tones, thereby permitting close examination of certain musical concepts.

It is also desirable in conjunction with the above objective to provide a device which visually, manipulatively, and tactually uniquely represents the music as it is being played enriching the listening experience by providing novelly employed sensory dimensions.

A still further objective of this invention is to provide a device which will visually and manipulatively uniquely demonstrate fingering patterns while an instrument is being played.

BRIEF DESCRIPTION OF THE INVENTION

Briefly described, this invention, in one form comprises a planar surface, such as a chalk board, having a representation of at least a portion of an instrument playing surface, for example the keyboard of a piano or the fingerboard of a violin. For simplicity of description the following description is directed primarily at the piano keyboard.

A colored indicator, such as a light, is mounted on each representation of a piano key. The conventional piano keyboard has alternating groups of three black keys and groups of two black keys with the groups being separated by two white keys. The lights mounted on the groups of three black keys are of one color, for example yellow, while the lights on the keys of the two black key groups are of a different color, for example red. The lights mounted on the white keys contiguous to the black keys of the three black key group are the same color as the two black key group, in this example red, while the white keys contiguous to the black keys of the two black key group are of the same color as the lights on the three black key group, in this example yellow. With this arrangement of colors, keys which are adjacent and have different colors are half steps or half tones apart while adjacent keys having like colors are whole steps or whole tones apart.

At least one line of equally distanced peg holes is provided in the chalk board adjacent to the keyboard representation and is aligned with the keyboard so that each white key and each black key have a peg hole directly in line therewith. Two sets of pegs are provided, one set having the same color as one set of lights (red) and the other set having the same color as the other set of lights (yellow).

The lights on the keyboard representation are appropriately wired to be adapted for use with a commercially available switching device which is mounted on a piano keyboard so that depression of a key on the piano keyboard effects illumination of the light on the corresponding key on the keyboard representation. Pegs of the same color as the illuminated lights can be placed in the corresponding peg holes to demonstrate musical concepts. Because the peg holes are in a chalk board surface the music instructor may further graphically illustrate the concept being taught by writing upon the surface.

In a second form of this invention the reverse side of the planer surface is a chalk board surface with peg holes corresponding to the peg holes on the first side. The entire surface is pivotally mounted on a frame so that the instructor may easily face either side toward his students. The increased chalk board surface with peg holes on the reverse side further enables the instructor to graphically illustrate the musical concepts being taught.

BRIEF DESCRIPTION OF THE DRAWINGS

This invention and its objectives and attendant advantages will be better understood from the detailed description below together with the drawings in which:

FIG. 3 is a front elevational view of a music teaching device formed in accordance with a second embodiment (violin) of this invention.

DETAILED DESCRIPTION OF THE INVENTION

Figure 1:
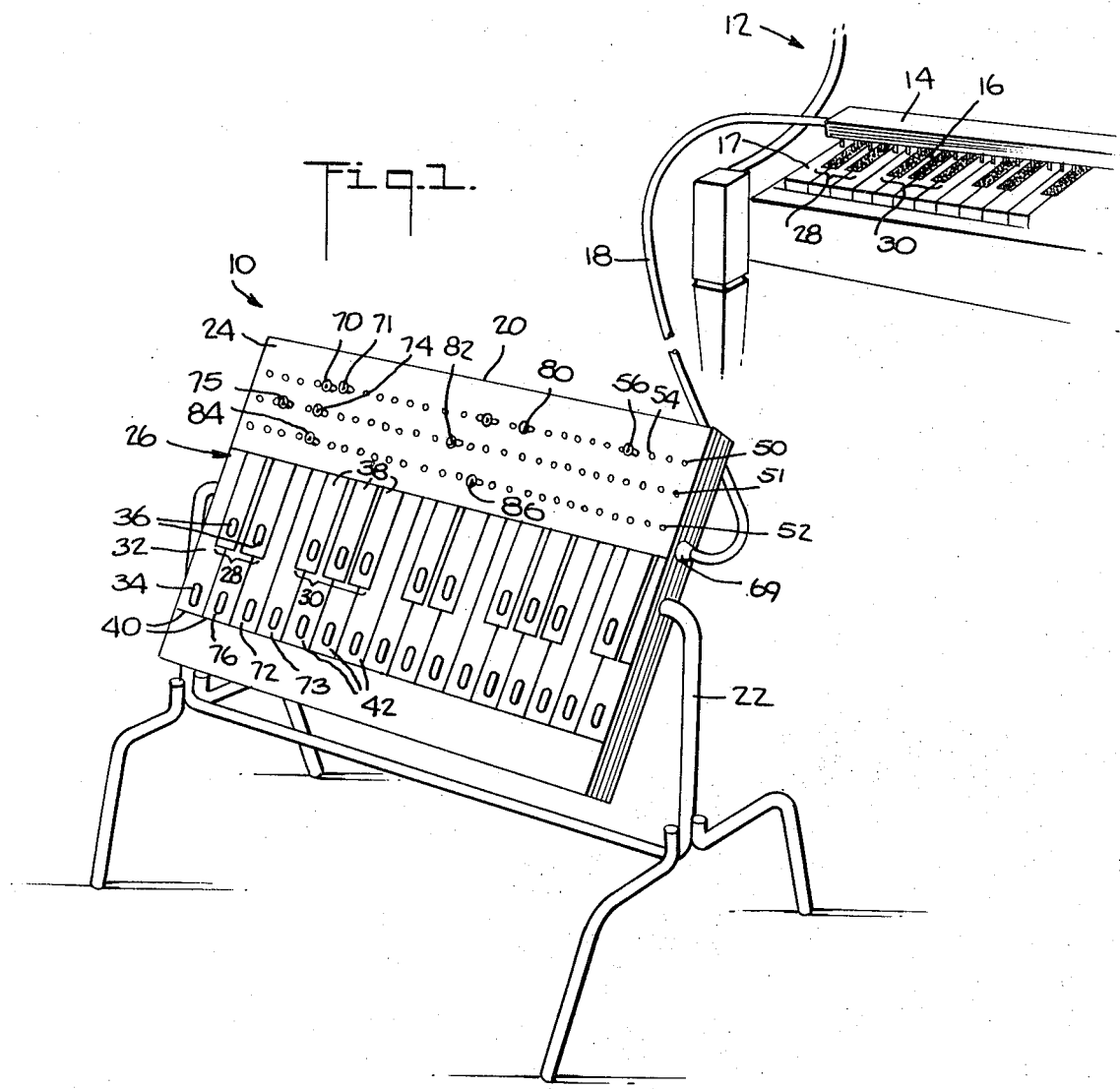
FIG. 1 is a perspective representation of a music teaching device formed in accordance with one embodiment (piano) of this invention.

With reference to the drawings, and more particularly FIG. 1, there is illustrated a music teaching device 10 formed in accordance with this invention and shown as used in combination with a conventional piano 12. The piano is fitted with a switch mechanism 14 which is commercially available. The switch mechanism includes individual rods 16 mounted on the piano keys 17, in such a manner that when the keys are depressed an electrical switch is closed putting forth an electrical pulse indicating the particular key which is depressed. This switch mechanism does not form a part of this invention and, therefore, a more detailed description of the mechanism is not necessary. An electrical conduit 18 leads from the switch mechanism 14 to the teaching device 10 and is electrically connected thereto as described below.

The teaching device 10 is formed as a planar member 20 pivotally mounted upon a frame 22. The planar member 20 has a front surface 24 on which is painted, or printed or otherwise placed an enlarged representation 26 of at least a portion of a piano keyboard (fingerboard). Although it is preferred that the entire keyboard be represented, if space limits the showing of the entire keyboard then it has been found that when designed for use as a teaching device for beginning music students at least 2 ½ octaves including Small Octave "c" (c) thru Two-lined Octave "g" (g2) be illustrated as that generally represents all but the lowest pitches notated on the Grand Staff, incorporating both Treble and Bass Clefs. Because of sapce limitations FIG. 1 illustrates even less than 2 ½ octaves; however the illustration is sufficient to illustrate this invention.

Piano keyboards are arranged with alternating groups of two black keys and three black keys, the two black key groups being designated by the numeral 28 and the three black key group being designated by the numeral 30. The groups 28 and 30 of the black keys are separated from each other by two white keys while the individual black keys within each group are separated from each other by a single white key. Starting on any key of the keyboard and going up (to the right) or down (to the left) twelve tones depressing each key 17 in order produces the chromatic scale, constructed entirely of half tones.

In order for the teaching device 10 to visually indicate which of the keys on the piano is being depressed, there is mounted on each key 32 of the teaching device an indicator 34, such as a light of a particular color. Two colors can be used to demonstrate tonal spacing. More specifically, the lights 36 on the black key group 28 are a first color, such as red, while the lights 38 on the black keys of the three black key group 30 are a different color, for example yellow. The lights on the white keys 40 contiguous to the two black key group 28 are of a different color than the contiguous black keys and, therefore, in this example are yellow, while the lights on the white keys 42 which are contiguous to the black keys of the three black key group 30 are red.

With this information it can be seen that if one starts with the first key on the representative keyboard 26 and proceeds chromatically across the entire keyboard the lights alternate color between yellow and red. In other words, when the teacher plays the chromatic scale on the piano 12 the teaching device 10 will in a visual way vividly illustrate the chromatic scale by alternating the color of the lights illuminated between yellow and red corresponding to the piano keys played. The significance of this from a teaching point of view is discussed below.

Located immediately above the keyboard representation 26 are at least one and preferably three parallel rows 50, 51, 52 of equally spaced holes 54 designed to receive pegs 56. Each line of three holes is aligned with a particular key and perpendicular to the rows 50–52; therefore, on a complete representation of a piano keyboard having 88 keys (counting both black and white keys) there would be 88 lines, each line having three holes.

The surface through which these holes are provided preferably is a chalk board or other surface which can be written upon easily and from which the writing can be readily removed so that the teacher is able to write and otherwise graphically augment the concepts being portrayed by the lights and pegs. Since two colors are used for the indicator lights on the representative keyboard (namely red and yellow) two groups of pegs are provided corresponding to these colors, namely a red group and a yellow group. This allows the teacher to place in graph-like manner the appropriately colored peg 56 in a hole 54 aligned with a corresponding color of an illuminated light which corresponds to a key 17 being depressed upon the piano keyboard.

Figure 2:
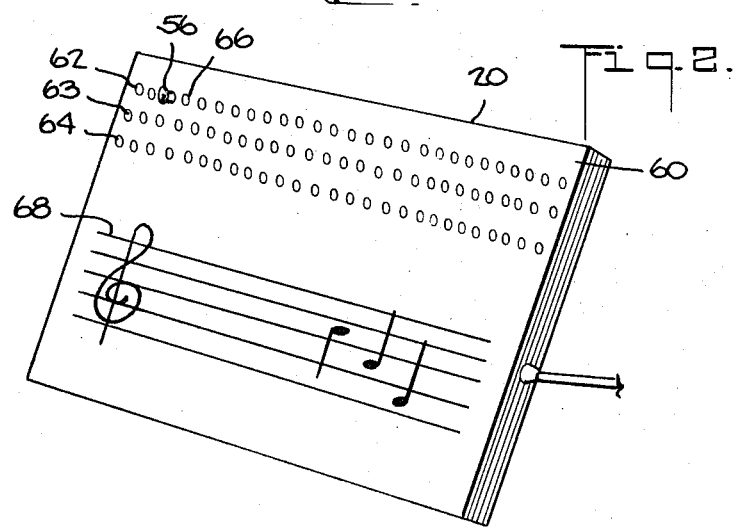
FIG. 2 is a perspective representation of the rear side of the device of FIG. 1.
Figure 9:
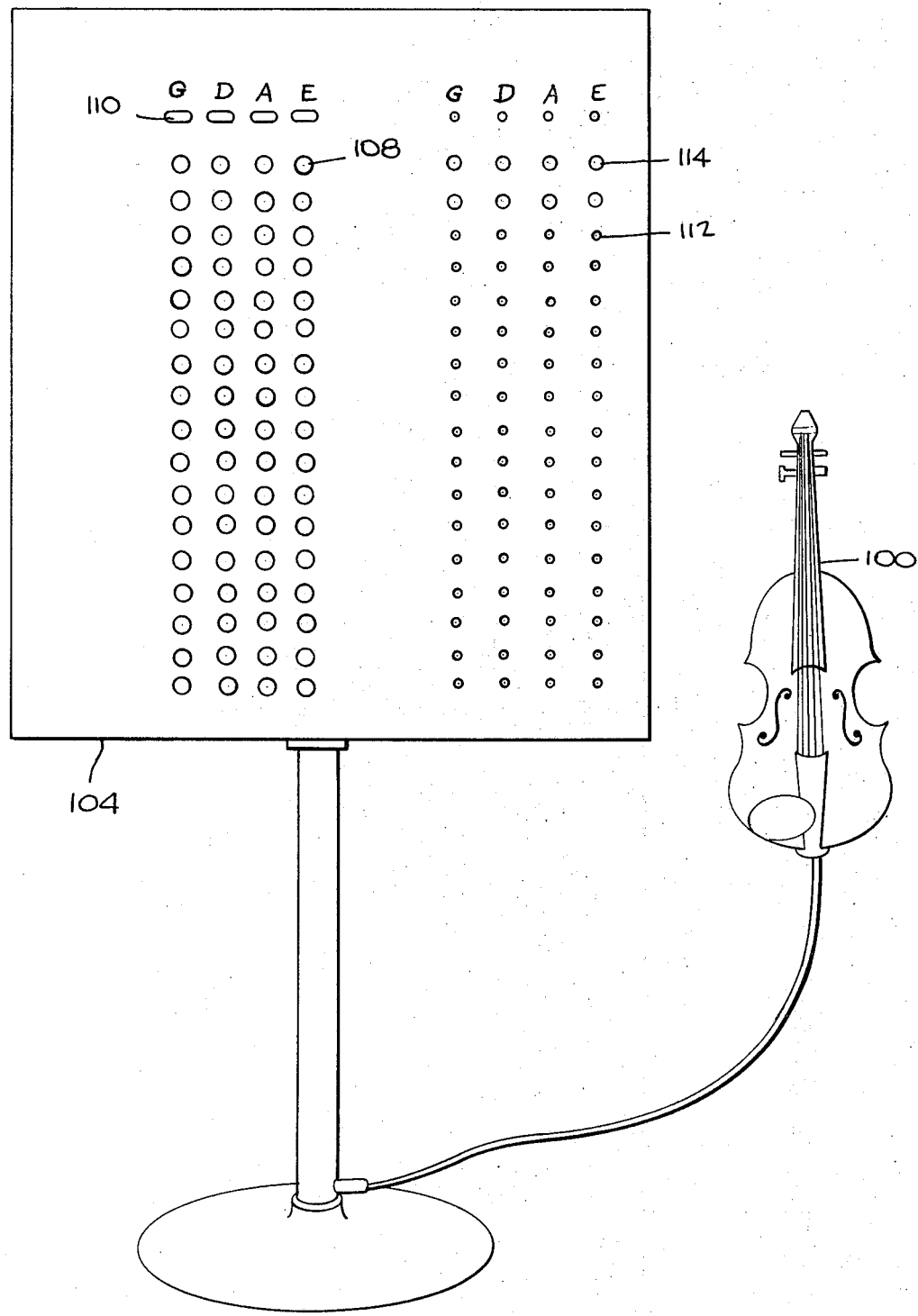

Turning now to FIG. 2, the rear surface 60 of the planar means 20 is also provided with at least one and preferably three lines 62, 63, 64 of holes 66 to receive the pegs 56. These lines of holes correspond to the lines 50, 51, 52 on the front surface of the device 10. The surface 60 is formed of material which can be written upon and easily erased, such as a chalk board. Most of the rear surface 60 is available for writing so that the teacher can use it in combination with the pegs 56 in the holes 66 to illustrate musical concepts. For example, a conventional staff 68 can be drawn on the chalk board and clef and notes placed thereon to illustrate the tones sounded on the piano and special comparison can be made between the notation and those same tones plotted using the pegs 56.

The indicator lights 34 are individually wired-in parallel to a plug or receptacle 69 which is adapted to receive the conduit 18 from the switch mechanism 14. It is also contemplated for an advanced form of teaching device 10 that the peg holes 54 also be wired to correspond to the keys 32 with which they are aligned and that the pegs 56 be illuminable such as by being made with a light bulb contained therein.

It has been found that to provide a visual correlation between a peg 56 and its corresponding light 34 that the lights preferably have an elongated configuration and a width approximately equal to that of the diameter of the head of the peg. The correlation between peg and light is also enhanced by having the lights project outwardly from the planar surface 24 in the same fashion as do the pegs 56.

One of the deficiencies with music teaching devices is their inability to, simultaneously with a sound presentation, clearly, visually, and manipulatively illustrate tonal space, particularly differences between half tones and whole tones. FIG. 1 shows how the device 10 of this invention manipulatively and visually accurately illustrates tonal spacing. Several pegs 56 are shown placed in the peg holes 54, corresponding to the particular keys 32 which were illuminated when a teacher depressed keys 17 on the piano 12 to demonstrate the difference between whole tones and half tones. Pegs 70, 71 are aligned with adjacent white keys 72, 73, white key 72 bearing a yellow indicator light and white key 73 bearing a red indicator light. Consequently, peg 70 is yellow and peg 71 is red.

As was described earlier, a change of color between adjacent keys represents a half tone tonal space. In row 51 peg 74 is aligned with the white key 72 and peg 75 is aligned with the white key 76. The white key 76 bears a yellow indicator light and, therefore, peg 75 is yellow. Since pegs 74 and 75 are both yellow and represent adjacent keys they are one whole tone apart. One can easily see and understand the tonal spacing representing half tones and whole tones by looking at and comparing the relative position of pegs 70 and 71 as compared with pegs 74 and 75 and yet each of these pairs of pegs is aligned with adjacent white keys. This is merely one example to demonstrate the effectiveness of illustration of tonal spacing which is accomplished with the device 10 of this invention.

Another illustration of the use of this device 10 for teaching musical concepts, this time involving larger than whole and half step intervals, is illustrated in FIG. 1. The distance between peg 71 and peg 80 in row 50 represents the interval of a Major Seventh, which here, though not everywhere on the keyboard, is the distance of seven white keys. Pegs 74 and 82 in row 51 represent a Minor Sixth, which here, though not everywhere on the keyboard, is the distance of six white keys. In row 52 the distance between the pegs 84 and 86 represent an Augmented Sixth which here, though not everywhere on the keyboard, is the distance of seven white keys. Again the simple manipulative and visual representation of certain structural aspects of music help to make obvious what above, if only notated on the staff, could become less than clear--structural aspects become obvious using the device 10.

The above description has been limited to use of this invention in connection with a piano 12 and piano keyboard representation 26. Other instruments, such as chimes, organ, xylophone, accordian and harpsichord for example are equally suitable to obtain the full advantages of this invention, namely the ability to uniquely teach tonal spacial concepts as well as finger patterns and the typography of the various tone producing portions of the musical instrument.

Figure 4:
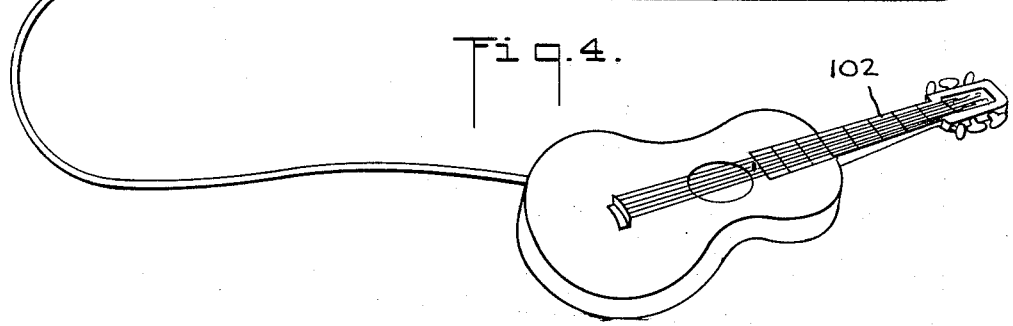
FIG. 4 is a front elevational view of a music teaching device formed in accordance with a third embodiment (guitar) of this invention.

It is also contemplated that enlarged representations of other instruments such as illustrated in FIGS. 3 and 4 similarly can be used to demonstrate various teaching objectives, although for some instruments the full range of advantages available to piano keyboards would not be obtainable. For example, the positions of a fingerboard 100 of a violin type (non-fretted), FIG. 3, or the fingerboard 102 guitar type (fretted) instrument (FIG. 4) is represented on planar member 104, 106 respectively. The violin and guitar is wired such that pressure upon each position on the fingerboards 100, 102 effects illumination of a light 108, 109 on a corresponding portion of the respective fingerboard tablature on the planar members. Because these fingerboards are set up linearly with the possibility of referring visually to half tone spacial differences, using this device tonal space as well as fingering patterns can be manipulatively and visually illustrated. Furthermore a light 110, 111 is aligned with the representation of each string to indicate which string is being played. Peg holes 112, 113 are provided to receive colored pegs 114 as described above. FIG. 4 also illustrates the provision of an additional writing surface 115 on the front side of the teaching device.

What is claimed as new and desired to be secured by Letters Patent of the United States is:

1. A music teaching device comprising the representation of at least a portion of a piano keyboard on one part thereof, the keyboard representation having alternating groups of three black keys and two black keys with adjacent groups being spaced apart by two white keys and adjacent black keys within each group being spaced apart by one white key, each key in each group of three black keys having an indicator of a first color and each key in each group of two black keys having an indicator of a second color, each white key contiguous to the black keys in the three black key group having an indicator of said second color and each white key contiguous to the black keys in the two black key group having an indicator of said first color, means coextensive with said representation for retaining at least one peg in alignment with each key of the representation, a first group of pegs of said first color and a second group of pegs of said second color, each of said pegs being adapted to be retained by said means.

2. The music teaching device of claim 1 wherein said indicators are lights.

3. The music teaching device of claim 1 wherein the means for retaining pegs are a plurality of equally spaced holes, at least one hole being aligned with each of said black and white keys.

4. The music teaching device of claim 3 wherein at least three holes are aligned in a first direction with each of said black and white keys and in a second direction perpendicular to said first direction with corresponding holes aligned with the other of said keys.

5. The music teaching device of claim 1 wherein the peg retaining means are provided in a chalk board.

6. The music teaching device of claim 2 wherein each of said lights projects outwardly from said representation.

7. The music teaching device of claim 2 wherein said device is adapted to be electrically connected to a piano keyboard such that depression of each key on the piano keyboard effects illumination of the light on a corresponding key on said device.

8. For use with a piano and means associated with said piano which produces an electrical signal corresponding to the depression of each piano key, a music teaching device comprising a planar member having the representation of at least a portion of a piano keyboard on one part thereof, the keyboard representation having alternating groups of three black keys and two black keys with adjacent groups being spaced apart by two white keys and adjacent black keys within each group being spaced apart by one white key, each key in each group of three black keys having an indicator light of a first color and each key in each group of two black keys having an indicator light of a second color, each white key contiguous to the black keys in the three black key group having an indicator light of said second color and each white key contiguous to the black keys in the two black key group having an indicator light of said first color, each of said keys being adapted for electrical connection to said means so that depression of each key on the piano keyboard effects illumination of the indicator light on its corresponding key of said representation, means coextensive in length with the keyboard representation for retaining at least one peg in alignment with each key in the representation, a first group of pegs of said first color and a second group of pegs of said second color, each of said pegs being adapted to be retained by the retaining means.

9. A music teaching device as defined in claim 8 wherein the side of said device opposite the side having the keyboard representation is a chalk board.

10. A music teaching device of claim 9 wherein the chalk board has second peg retaining means corresponding in spacing and alignment to the first peg retaining means.

11. A music teaching device for demonstrating tonal space relationships comprising the representation of at least a portion of the fingerboard of a stringed instrument, the representation having a plurality of columns, each column including a plurality of equally spaced positions representing the tablature for the finger positions on the instrument, electrically conductive means, each position on the representation having an electrically illuminable indicator responsive to said conductive means and adapted to be electrically connected to its corresponding finger position on a stringed instrument corresponding to said representation, by said conductive means, whereby when said conductive means is connected to said stringed instrument, placement of fingers on the finger positions on the instrument effects illumination of the corresponding indicators on the representation.

12. The music teaching device of claim 11 including means coextensive with said representation for retaining at least one peg in alignment with each of said positions of the representation.

13. The music teaching device of claim 11 wherein alternating indicators in each column are a first color and the intermediate indicators in each column are of a second color.

* * * * *